United States Patent Office

3,576,781
Patented Apr. 27, 1971

3,576,781
PROCESS FOR PREPARING FUSIBLE POLYHYDROXY-POLYETHER RESINS
Darrell D. Hicks, Louisville, Ky., assignor to Celanese Coatings Company, New York, N.Y.
No Drawing. Continuation-in-part of application Ser. No. 771,267, Oct. 28, 1968. This application Feb. 2, 1970, Ser. No. 8,003
Int. Cl. C08g 30/10
U.S. Cl. 260—32.8
12 Claims

ABSTRACT OF THE DISCLOSURE

A process for preparing polyhydroxy-polyether resins, useful as film forming and coating compositions, by reacting a polyepoxide compound with a polyhydric alcohol in a ketone solvent using a Lewis acid catalyst.

CROSS-REFERENCE TO RELATED APPLICATION

This is a continuation-in-part of U.S. patent application, Ser. No. 771,267, filed Oct. 28, 1968, and now abandoned.

BACKGROUND OF THE INVENTION

This invention pertains to the field of synthetic resins made in a solvent by the reaction of a polyepoxide resin and a polyhydric alcohol.

The reactions of polyepoxide resins with polyhydric alcohols are described in U.S. Pat. 2,731,444. One class of compounds described in this patent are produced by the reaction of polyhydric alcohols in less than equivalent amounts with epoxide resins to produce higher molecular weight epoxy containing compositions. Another class of products are made by reacting an excess of polyhydric alcohol with the epoxide resin to produce a resinous product devoid of epoxy groups. A still further class of products are obtained by reacting the polyhydric alcohol and the epoxide resin in equivalent proportions. When the reaction is stopped before completion, the product will contain unreacted epoxy groups. If carried to substantial completion, the product will be a cross-linked insoluble and infusible thermoset composition. The reactions of the polyhydric alcohols with the polyepoxide compounds are conducted either with an alkaline catalyst or with no catalyst.

U.S. Pat. 3,352,804 describes the preparation of modified epoxide resins by the reaction of a diepoxide compound with pentaerythritol. No catalysts or solvents are used in the reaction and the product contains unreacted epoxy groups.

Lewis acids or Friedel-Crafts catalysts, e.g., boron trifluoride, will catalyze the conversion of polyepoxide resins to the thermoset state. The cross-linking reaction is initiated by the reaction of an epoxy group with an active hydrogen compound to form a hydroxy group, followed by reaction of another epoxy group with the formed hydroxy group which in turn forms another hydroxy group. Since the epoxide resin is polyfunctional, the above reaction takes place in multidirections and results in, at first, branched chains and ultimately cross-linked products. When polyhydric alcohols are initially present in admixture with the polyepoxide compound and the Lewis acid catalyst, the reaction takes place in the same manner between the epoxy groups of the polyepoxide and the hydroxy groups of the polyol, resulting in highly branched cross-linked products.

SUMMARY

This invention relates to polyhydroxy-polyether resins and in particular pertains to a process for preparing such polyhydroxy-polyether resins in solution.

By this invention, polyhydroxy-polyether resins are made which contain no unreacted epoxy groups and which are soluble and fusible. These polyhydroxy-polyether resins result from the reaction of a polyepoxide compound with a polyhydric alcohol, wherein at least one epoxy group of the polyepoxide compound is present for each hydroxy group of the polyhydric alcohol, using a Lewis acid as catalyst and a liquid organic ketone as solvent. In the absence of a ketone solvent, the polyepoxide compound and the polyhydric alcohol will form a cross-linked infusible product under the influence of a Lewis acid catalyst. However, when a ketone solvent is used, non-gelled fusible and soluble polyhydroxy-polyethers result.

DESCRIPTION OF THE INVENTION

Polyepoxide compounds useful in this invention are those which contain more than one 1,2 epoxy group per molecule. Examples of such polyepoxide compounds include polyglycidyl ethers of polyhydric phenols, which are generally prepared by reacting a polyhydric phenol with a molar excess of epichlorohydrin using caustic alkali as the catalyst and dehydrohalogenating agent. Examples of polyhydric phenols from which these glycidyl ethers are made are p,p'-dihydroxydiphenyl propane (commonly called Bisphenol A), resorcinol, hydroquinone, p,p'-dihydroxydiphenyl methane, p,p'-dihydroxydiphenyl, dihydroxybenzophenone, dihydroxydiphenyl sulfone, novolak resins made by reacting an excess of phenol or substituted phenol (cresol, for example) with an aldehyde, tetrahydroxytetraphenyl ethane, and aromatic ring brominated and chlorinated derivatives of these polyhydric phenols.

Polymeric polyglycidyl ethers can also be used in this invention. Such polymeric polyglycidyl ethers can be made as described in U.S. Pats. 2,615,007 and 2,615,008 by reacting a low molecular weight diglycidyl ether of a dihydric phenol with added dihydric phenol or by reacting a dihydric phenol with less than two mols of epichlorohydrin using caustic alkali substantially equivalent to the chlorine of the epichlorohydrin used.

Additional polyepoxide compounds are polyglycidyl ethers of polyhydric alcohols, made by the reaction of a polyhydric alcohol with epichlorohydrin as described in U.S. Pat. 3,033,803.

Still other useful polyepoxide compounds are those made by the epoxidation of unsaturated hydrocarbons. Such polyepoxide compounds include vinyl cyclohexene dioxide, 3,4-epoxycyclohexylmethyl-3,4-epoxycyclohexane carboxylate, bis(3,4-epoxycyclohexylmethyl) sebacate, dicyclopentadiene diepoxide, epoxidized polybutadiene, epoxidized vegetable oils, and the like. These polyepoxide compounds are epoxidized hydrocarbons, hydrocarbon ethers or hydrocarbon esters, wherein the hydrocarbons are aliphatic or alicyclic and contain at least two ethylenically unsaturated groups before epoxidation.

The preferred polyepoxide compounds are those which contain about two to about five 1,2 epoxy groups per molecule. The more preferred are the diglycidyl ethers of dihydric phenols with the most preferred being the digylcidyl ether of p,p'-dihydroxydiphenyl propane (Bisphenol A), which, as supplied commercially, has an epoxide equivalent weight of about 180 to 210.

The polyhydric alcohols useful in this invention contain at least two aliphatic hydroxyl groups per molecule and no other groups reactive with epoxy groups. Examples of such polyhydric alcohols are ethylene glycol, propylene glycol, butylene glycol, hexylene glycol, polyoxyalkylene glycols, trimethylol ethane, trimethylol propane, pentaerythritol, erythritol, castor oil, dipentaerythritol, hydroxy terminated polyoxyalkylene ethers of polyols, e.g., polyoxypropylene ether of trimethylol propane, and the like. The preferred polyhydric alcohols are those which contain 3 to 4 hydroxy groups per molecule.

Further examples of useful polyhydric alcohols include the polyhydroxyalkyl esters of polybasic carboxylic acids having the general formula $$R(COOR'OH)_n$$

wherein R is the aliphatic, cycloaliphatic, or aromatic hydrocarbon portion of the polybasic carboxylic acid, R' is an alkylene radical which contains from about 2 to 10 carbon atoms and $n$ has a value of 2 or 3. These polyhydroxyalkyl esters can be prepared by reacting a polybasic carboxylic acid or the corresponding anhydride with a glycol, a cyclic carbonate, or a 1,2-monoepoxide. Examples of useful polybasic carboxylic acids and anhydrides include ortho-phthalic acid, ortho-phthalic anhydride, isophthalic acid, terephthalic acid, trimellitic acid or anhydride, fumaric acid, maleic anhydride, azelaic acid, adipic acid, sebacic acid, oxalic acid, dimerized and trimerized fatty acids, tetrahydrophthalic acid or anhydride, hexohydrophthalic acid or anhydride and the like.

Suitable glycols which can be reacted with the polybasic carboxylic acids include ethylene glycol, 1,2-propylene glycol, 1,3-propylene glycol, 1,4-butanediol, 1,6-hexanediol and the like. Useful cyclic carbonates are ethylene carbonate, 1,2-propylene carbonate, 3,4-hexylene carbonate, etc. Examples of useful 1,2-monoepoxides which can be reacted with the polybasic carboxylic acids to form the polyhydroxyalkyl esters are ethylene oxide, propylene oxide, butylene oxide, butyl glycidyl ether, phenyl glycidyl ether, 1,2-decene oxide, and the like. A particularly useful polyhydroxyalkyl ester is bis(2-hydroxyethyl)terephthalate.

Lewis acids useful in this invention include aluminum trihalides, ferric halides, tin tetrahalides, boron trihalides, zinc halides, hydrogen fluoride, sulfuric acid, phosphorous pentoxide, phosphoric acid, fluoboric acid, zinc fluoborate, and the like. The preferred catalysts are boron trifluoride, boron trifluoride etherates and stannic chloride.

The organic ketone solvents useful in this invention are compounds which contain at least one ketone group and no other groups which are reactive with epoxy groups or hydroxy groups under conditions of the reaction. These compounds are liquids at room temperature and have boiling points of at least about 55° C. up to about 225° C. or above. Examples of such ketone solvents are acetone, acetophenone, cyclohexanone, diethyl ketone, di-isobutyl ketone, ethyl amyl ketone, ethyl butyl ketone, isophorone, mesityl oxide, methyl isoamyl ketone, methyl isobutyl ketone, methyl n-propyl ketone and the like. The preferred ketones are those which contain one ketone group and up to about twelve carbon atoms, with the most preferred containing a methyl group adjacent to the ketone group and a total of three to eight carbon atoms.

In carrying out the process of this invention, the polyepoxide resin and the polyhydric alcohol are reacted in such amounts that there are about 1 up to about 2 epoxy equivalents present for each hydroxy group of the polyol. Somewhat less than one epoxy equivalent can be used but if the ratio is reduced too far, low polymers are formed and some unreacted polyol may result. It is preferred that the ratio of epoxy equivalents to hydroxy equivalents be no less than about 0.75. When a ratio of more than two epoxy groups are present for each hydroxy group, high amounts of ketone solvent are required and careful control of the reaction conditions are needed to present gelation. The preferred range of epoxy equivalent to hydroxy equivalent is 0.75 to 2 epoxy equivalents per hydroxy equivalent with the most preferred being 1 to about 1.67.

In order to prevent gelation of the reactants before all the epoxide groups have reacted, a ketone solvent must be present in the amount of at least about 2 mols of ketone for each epoxy group of the epoxide resin. Some variations have been found in the amount of ketone needed to prevent gelation depending upon the functionality of the epoxide resin and of the polyol and the equivalent ratios of these reactants. If more functional reactants are used or if a ratio of epoxy to hydroxy of more than 1 is utilized, somewhat higher amounts of ketone are required. However, such minimum or desired amounts can be readily determined by one skilled in the art. The maximum amount of ketone solvent is not dependent upon the reactants but will be governed by the size of the reactor, the desired percent solids in the final solution and other economic factors. Generally, no more than about 10 mols of ketone will be used for each epoxide equivalent.

Other solvents which contain no groups reactive with epoxy groups or hydroxy groups under the conditions of the reaction can be used in admixture with the ketone solvents if a higher dilution of the reactants is desired.

The amount of Lewis acid catalyst, based upon the total weight of polyepoxide and polyhydric alcohol, will be used in catalytic amounts and in sufficient amounts to catalyze the reaction. Generally, about 0.1 to about 5% by weight will suffice.

In carrying out the process of this invention, the polyepoxide resin, the polyhydric alcohol and the ketone solvent can be mixed together, the Lewis acid catalyst can be added and the reaction will progress with or without the addition of heat. However, in order to control the rate of reaction, it is preferred to add the polyepoxide resin slowly to the mixture of polyhydric alcohol, at least part of the ketone solvent and the Lewis acid catalyst. The reaction can be carried out at a temperature of about 15° C. to about 150° C. with the preferred temperature being about 25° C. to about 100° C. The time of reaction is a time long enough for all the epoxy groups to react, and will depend upon the reactants, the temperature, the rate of addition, the cooling and heating capacity of the reactor, and other controlling conditions.

The polyhydroxy-polyethers made by this invention are useful in preparing decorative and protective coatings when blended with a cross-linking agent. Useful cross-linking agents are those compounds which are reactive with hydroxy groups, such as aminoplast resins, polyisocyanates and polyepoxide resins.

The following examples serve to further illustrate the invention and described in detail how the invention can be practiced. Parts and percentages where used are parts and percentages by weight.

EXAMPLE 1

A suitable reactor was equipped with a mechanical stirrer, thermometer, reflux condenser and dropping funnel. To the dropping funnel were added 122.6 parts of the diglycidyl ether of Bisphenol A—epoxide equivalent weight of 190—dissolved in 100 parts of methyl isobutyl ketone and to the reactor were added 127.4 parts of castor oil, 150 parts of methyl isobutyl ketone and 1 part of $BF_3$ etherate. Heat and stirring were applied to the reactor and when the temperature of the reactor contents reached 65° C., the addition of the diglycidyl ether solution was begun and was continued over a period of one hour and twenty-eight minutes while holding the temperature between 56° and 65° C. After all the diglycidyl ether solution had been added, the temperature was raised to 100° C. and was held at 100° C. for about one hour. The heat source was removed allowing the temperature to drop to room temperature. Ten parts of an anion exchange resin were added to aid in removing the Lewis acid catalyst. The temperature was raised to 85° C. and was held at this temperature for one hour. The polymer solution was then cooled and filtered to remove the anion exchange resin. The product at 54% solids, had a Gardner-Holdt viscosity at 25° C. of N–O, a Gardner color of 6–7, and a negative epoxide content.

22.2 parts of the resin solution were blended with 13.3 parts of butylated urea-formaldehyde resin at 60% solids in butanol and xylene, 4.5 parts of xylene and 0.2 part of a 50% solution of the morpholine salt of butyl acid phosphate in ethylene glycol monobutyl ether. 3 mil films were drawn down on glass and were baked for 30 minutes at 150° C. The resulting well cured films were clear and colorless, and exhibited very good mar resistance and gloss.

EXAMPLE 2

Using the same procedure described in Example 1, 233.2 parts of a 50% solution of a polyglycidyl ether of Bisphenol A—epoxide equivalent weight of 467—in methyl isobutyl ketone were reacted with 83.4 parts of castor oil in 83.4 parts of methyl isobutyl ketone using 1 part of BF$_3$ etherate as catalyst. The resulting product at 50.8% solids had a Gardner-Holdt viscosity at 25° C. of S, a Gardner color of 4–5 and a negative epoxide content.

27.6 parts of the resin solution were blended with 10 parts of a 60% solution of butylated urea-formaldehyde resin in butanol and xylene, 2.4 parts of xylene and 0.2 part of the morpholine salt of butyl acid phosphate at 50% solids in ethylene glycol monobutyl ether. Three mil films were drawn down on glass panels and were baked at 150° C. for 30 minutes. Well cured films were obtained which had a pencil hardness of F–H, excellent mar resistance and high gloss.

EXAMPLE 3

Using the same procedure as was described in Example 1, 115 parts of the diglycidyl ether of Bisphenol A, described in Example 1 and dissolved in 100 parts of methyl disobutyl ketone, were added to 85 parts of the trihydroxy polyoxypropylene ether of trimethylol propane having an average molecular weight of 418 and dissolved in 200 parts of methyl isobutyl ketone and 1 part of BF$_3$ etherate. The addition time was one hour while holding the temperature at 60°–67° C. The temperature was then raised to 100° C. and was held at 100° C. for one hour. After cooling to room temperature, 10 parts of anion exchange resin were added, stirring was begun, and the temperature was raised and held at 80° C. for one hour. After cooling and filtering the polymer solution had a solids content of 43%, a Gardner-Holdt viscosity at 25° C. of B–C, a Gardner color of 1 and a negative epoxide content.

Tough, well cured, mar resistant films were prepared from this polymer solution in admixture with a butylated urea-formaldehyde resin using the procedure described in Example 1.

EXAMPLE 4

To a suitable reactor equipped as described in Example 1 were added 38 parts of trimethylol propane, 170 parts of methyl ethyl ketone and 1 part of BF$_3$ etherate. The temperature was raised to 59° C. and dropwise addition of 162 parts of the diglycidyl ether of Bisphenol A (epoxide equivalent—190) in 75 parts of methyl ethyl ketone were begun. After the addition was completed in one hour and sixteen minutes, heating at 64° C. was continued for one hour and twenty-one minutes. The resulting polymer solution was cooled to room temperature, 10 parts of anion exchange resin were added and heating and stirring were continued for one hour at about 65° C. The anion exchange resin was then removed by filtration, and the methyl ethyl ketone was distilled off to a temperature of 109° C. using full water aspirator vacuum. The resinous product was redissolved in 100 parts of xylene and 50 parts of methyl isobutyl ketone (MIBK). The resulting solution had a Gardner-Holdt viscosity at 25° C. of G at 60.8% solids, a Gardner color of 3 and a negative expoxide content.

In this reaction, one epoxy equivalent of the glycidyl ether was present for each hydroxy equivalent of the trimethylol propane, and 4 mols of methyl ethyl ketone were present for each epoxy equivalent.

EXAMPLE 5

Using the same procedure as was described in Example 4, 38 parts of trimethylol propane were reacted with 162 parts of the diglycidyl ether of Bisphenol A having an epoxide equivalent of 190 (ratio of epoxy to hydroxy of 1:1) using decreasing amounts of methyl ethyl ketone (MEK) with the following results:

| Example: | Mols MEK to epoxy equivalent | Final solvent | Percent solids | Gardner-Holdt viscosity | Gardner color |
| --- | --- | --- | --- | --- | --- |
| 5 | 3.27 | 2/1 xylene/MIBK | 60.7 | L | 3 |
| 6 | 2.68 | do | 60.0 | U | 4 |
| 7 | 2.17 | 56/44 xylene/MIBK | 42.8 | S | 2–3 |
| 8 | 1.76 | Gelled | | | |

Examples 5, 6 and 7 had negative epoxide contents.

In Example 8, the solution was very viscous after the addition of the diglycidyl ether and five minutes after the addition was completed, the reactants formed a hard gel.

Excellent well cured films were prepared from blends of Examples 4, 5, 6 and 7 with butylated urea-formaldehyde resin using the procedure described in Example 1.

EXAMPLE 9

Using the same procedure described in Example 4, 88 parts of the tetrahydroxypolyoxypropylene ether of pentaerythritol having an average molecular weight of 600 were reacted with 112 parts of the diglycidyl ether of Bisphenol A having an epoxy equivalent weight of 190 using 245 parts of methyl ethyl ketone solvent. The hydroxy equivalent of the polyol was equal to the epoxy equivalent of the diglycidyl ether and 5.76 mols of ketone were present for each epoxy equivalent. The resulting product when dissolved at 51.8% solids in xylene had a Gardner-Holdt viscosity at 25° C. of J, a Gardner color of 2 and a negative epoxy content.

EXAMPLE 10

Using the same procedure described in Example 1, 114.8 parts of the diglycidyl ether of Bisphenol A having an epoxy equivalent weight of 190 and dissolved in 100 parts of methyl isobutyl ketone (MIBK) were added dropwise to 85.2 parts of the trihydroxy polyoxypropylene ether of trimethylol propane described in Example 3, dissolved in 200 parts of MIBK. One part of BF$_3$ etherate was used as catalyst. The addition of the diglycidyl ether was completed after 57 minutes at 65° C. The polymer solution was heated at 65° C. for one hour, 10 parts of anion exchange resin were added, and heating was continued for one hour at 65° C. After cooling, the anion exchange resin was filtered out and the ketone solvent was distilled off. The resulting polymer was dissolved in xylene at 43.9% solids, the Gardner-Holdt viscosity at 25° C. was J–K, the Gardner color was 1, and the epoxy content was negative.

EXAMPLE 11

Example 10 was repeated except the temperature was held at 22°–28° C. during the addition of the diglycidyl ether and before the removal of the catalyst by the anion exchange resin. The resulting polymer solution at 50.6% solids in xylene had a Gardner-Holdt viscosity of C at 25° C., a Gardner color of 2 and a negative epoxy content.

EXAMPLE 12

To a suitable reactor equipped as described in Example 1 were added 303.1 parts of bis(2-hydroxyethyl) terephthalate, 150 parts of methyl ethyl ketone and 149.9 parts of xylene. To the dropping funnel were added 416.9 parts of the diglycidyl ether of Bisphenol A (epoxide equivalent weight of 175) dissolved in 180.1 parts of xylene. Heat and stirring were applied to the reactor. When the temperature in the reactor reached 85° C., 2.4 cc. of BF₃ etherate were added, following by the slow addition of the diglycidyl ether solution. The diglycidyl ether solution was added over a period of 1 hour and 34 minutes while controlling the temperature between 85 and 100° C. Heating within this temperature range was continued for 51 minutes to complete the reaction. The heat source was removed and 108 parts of Cellosolve acetate were added followed by the addition of 16.3 parts of anion exchange resin. After holding the reactants at 60° C. for 1 hour, the resulting solution was filtered to remove the anion exchange resin. The solution had a solids content of 60.8% and a Gardner viscosity at 25° C. of V–W.

Twenty three parts of the resin solution were blended with 10 parts of a 60% solution of butylated urea-formaldehyde resin in xylene and butanol, and 7 parts of methyl isobutyl ketone. Films were drawn down with a 3 mil doctor blade on steel panels bonderized with zinc phosphate, and were baked at 200° C. for 15 minutes. The resulting films were well cured and exhibited excellent mar resistance and adhesion to the substrate. The films had a pencil hardness of 3H–4H and passed an 80 inch pound convex impact test.

It is to be understood that the foregoing detailed description is given merely by way of illustration and that many variations may be made therein without departing from the spirit of the invention.

The embodiments of the invention in which an exclusive property or privilege is claimed are defined as follows:

1. A process for preparing fusible and soluble polyhydroxy-polyether resins containing no unreacted epoxy groups which comprises reacting a polyepoxide compound containing more than one 1,2-epoxy group per molecule with a polyhydric alcohol containing at least two alcoholic hydroxyl groups per molecule using a Lewis acid as catalyst and a liquid organic ketone as solvent wherein said catalyst is present in catalytic amounts and at least about two mols of said ketone are present for each epoxy equivalent of said polyepoxide compound.

2. The process of claim 1 wherein the polyepoxide compound and the polyhydric alcohol are in the ratio of 0.75 to 2 epoxy groups of the polyepoxide compound to 1 hydroxy group of the polyhydric alcohol.

3. The process of claim 2 wherein the polyepoxide compound has two to five 1,2-epoxy groups per molecule and wherein the polyhydric alcohol has 3 to 4 aliphatic hydroxy groups per molecule.

4. The process of claim 2 wherein the polyepoxide compound and the polyhydric alcohol are in the ratio of 1 to 1.67 epoxy groups to 1 hydroxy group.

5. The process of claim 2 wherein the liquid organic ketone contains one ketone group per molecule and 3 to 12 carbon atoms.

6. The process of claim 2 wherein the Lewis acid catalyst is boron trifluoride, boron trifluoride etherate or stannic chloride.

7. The process of claim 2 wherein the polyepoxide compound is a polyglycidyl ether of a polyhydric phenol.

8. The process of claim 2 wherein the liquid organic ketone contains one ketone group per molecule, a methyl group adjacent to the ketone group and a total of 3 to 8 carbon atoms.

9. The process of claim 2 wherein the polyhydric alcohol is a polyhydroxyalkyl ester of a polybasic carboxylic acid, said polyhydric alcohol having the general formula $$R(COOR'OH)_n$$

wherein R is the aliphatic, cycloaliphatic, or aromatic hydrocarbon portion of the polycarboxylic acid, R' is an alkylene radical having from about 2 to 10 carbon atoms and $n$ has a value of 2 or 3.

10. The process of claim 9 wherein the polyhydric alcohol is bis(2-hydroxyethyl) terephthalate.

11. The process of claim 2 wherein the polyepoxide compound is the diglycidyl ether of p,p'-dihydroxydiphenyl propane, the polyhydric alcohol is trimethylol propane, the liquid organic ketone is methyl ethyl ketone and the Lewis acid catalyst is boron trifluoride etherate.

12. The process of claim 11 wherein the epoxide equivalents of the diglycidyl ether and the hydroxyl equivalents of the trimethylol propane are in the ratio of 1 to 1.

References Cited

UNITED STATES PATENTS

| | | | |
|---|---|---|---|
| 2,728,744 | 12/1955 | May et al. | 260—47 |
| 2,731,444 | 1/1956 | Greenlee | 260—47 |
| 2,914,490 | 11/1959 | Wheelock | 260—2 |
| 2,990,396 | 6/1961 | Clark et al. | 260—47 |
| 3,306,872 | 2/1967 | Maycock et al. | 260—32.8 |
| 3,379,791 | 4/1968 | Larson et al. | 260—830 |

WILLIAM H. SHORT, Primary Examiner

T. E. PERTILLA, Assistant Examiner

U.S. Cl. X.R.

260—2EC, 18EP, 47EC, 94.2R, 58R, 75EP